(12) United States Patent
Okazaki et al.

(10) Patent No.: US 12,424,689 B2
(45) Date of Patent: Sep. 23, 2025

(54) PLATE FOR BATTERY STACK AND BATTERY STACK

(71) Applicants: Yazaki Corporation, Tokyo (JP); TOYOTA JIDOSHA KABUSHIKI KAISHA, Toyota (JP); KABUSHIKI KAISHA TOYOTA JIDOSHOKKI, Kariya (JP)

(72) Inventors: Yutaro Okazaki, Kakegawa (JP); Shinichi Yanagihara, Kakegawa (JP); Satoshi Morioka, Okazaki (JP); Motoyoshi Okumura, Nagoya (JP); Hiromi Ueda, Kariya (JP); Naoto Morisaku, Kariya (JP)

(73) Assignees: YAZAKI CORPORATION, Tokyo (JP); TOYOTA JIDOSHA KABUSHIKI KAISHA, Aichi-ken (JP); KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 526 days.

(21) Appl. No.: 17/733,261

(22) Filed: Apr. 29, 2022

(65) Prior Publication Data

US 2022/0352587 A1 Nov. 3, 2022

(30) Foreign Application Priority Data

Apr. 30, 2021 (JP) .................. 2021-078141

(51) Int. Cl.
*H01M 50/204* (2021.01)
*H01M 10/48* (2006.01)
(Continued)

(52) U.S. Cl.
CPC ....... *H01M 50/204* (2021.01); *H01M 10/482* (2013.01); *H01M 10/486* (2013.01); *H01M 50/291* (2021.01); *H01M 50/296* (2021.01); *H01M 50/502* (2021.01); *H01M 50/553* (2021.01); *H01M 50/593* (2021.01)

(58) Field of Classification Search
CPC ............. H01M 50/204; H01M 50/291; H01M 50/296; H01M 50/502; H01M 50/593; H01M 50/553; H01M 50/209; H01M 10/482; H01M 10/486
See application file for complete search history.

(56) References Cited

U.S. PATENT DOCUMENTS

2008/0199765 A1\* 8/2008 Yoon ................... H01M 10/425
429/91

FOREIGN PATENT DOCUMENTS

JP 2020198211 A 12/2020

\* cited by examiner

*Primary Examiner* — Eugenia Wang
(74) *Attorney, Agent, or Firm* — Sughrue Mion, PLLC (57) ABSTRACT

There are provided a plate for a battery stack configured to be sandwiched between a plurality of power storage modules, and a battery stack. The plate for the battery stack includes: a plate-shaped housing having a fitting groove provided in a recessed shape in a first plate side surface of the plate for a battery stack along a longitudinal direction thereof, the fitting groove being a groove configured to fit with a side edge portion of a conductive plate disposed between the plurality of stacked power storage modules; and a plurality of recessed holes formed side by side in a direction orthogonal to a plate thickness direction of the plate for a battery stack, and extending from a second plate side surface of the housing.

11 Claims, 9 Drawing Sheets

(51) Int. Cl.
*H01M 50/291* (2021.01)
*H01M 50/296* (2021.01)
*H01M 50/502* (2021.01)
*H01M 50/553* (2021.01)
*H01M 50/593* (2021.01)

PLATE FOR BATTERY STACK AND BATTERY STACK

This application is based on and claims priority under 35 USC 119 from Japanese Patent Application No. 2021-078141 filed on Apr. 30, 2021, the contents of which are incorporated herein by reference.

TECHNICAL FIELD

The present disclosure relates to a plate for a battery stack and a battery stack including the plate for the battery stack.

BACKGROUND ART

Various power storage devices have been proposed in related-art, and for example, a power storage device disclosed in JP2020-198211A includes a plurality of stacked power storage modules and a plurality of plate-shaped members disposed between the power storage modules.

The plurality of power storage modules and the plurality of plate-shaped members are disposed between a pair of insulating plates, and a restraining force is applied thereto by a restraining tool, thereby constituting a stacked body (battery stack) formed in a substantially rectangular parallelepiped shape.

The power storage module includes a resin frame, a plurality of battery cells, and a plurality of current collector plates. The plate-shaped member includes a conductive portion (conductive plate) that electrically connects adjacent power storage modules to each other, and an insulating portion (plate for battery stack) disposed on an outer periphery of the plate-shaped member. Since the insulating portion of the plate-shaped member is located on an outer peripheral surface of the power storage device, an amount of exposure of the conductive portion from the outer peripheral surface of the energy storage device can be reduced.

The insulating portion of the plate-shaped member sandwiched between the plurality of stacked power storage modules as described above is formed by injection molding of, for example, an insulating resin material into a rectangular flat plate shape having a predetermined plate thickness in order to maintain the plurality of power storage modules at a predetermined interval. However, when a thickness of the flat plate-shaped insulating portion is large, molding defects such as sink marks and warpage may occur during injection molding.

Therefore, it is conceivable to provide a plurality of recessed portions on plate surfaces (front and back surfaces) of the flat plate-shaped insulating portion to reduce the thickness while ensuring a compressive strength in a plate thickness direction and an apparent plate thickness, thereby preventing molding defects such as sink marks and warpage. However, in a case where a plurality of recessed portions are provided on a plate surface of the insulating portion that is a stacked surface, unevenness due to the plurality of recessed portions is formed on the plate surface of the insulating portion. Therefore, when a restraining force is applied to the insulating portion of the plate-shaped member provided with the plurality of recessed portions by a restraining tool for constituting a stacked body, sandwiched surfaces of the power storage modules may be damaged or the stacked surfaces may be lifted due to inclination.

SUMMARY OF INVENTION

The present disclosure provides a plate for a battery stack, which can be favorably sandwiched between a plurality of stacked power storage modules, and a battery stack.

According to an illustrative aspect of the present disclosure, a plate for a battery stack configured to be sandwiched between a plurality of power storage modules, includes: a plate-shaped housing having a fitting groove provided in a recessed shape in a first plate side surface of the plate for a battery stack along a longitudinal direction thereof, the fitting groove being a groove configured to fit with a side edge portion of a conductive plate disposed between the plurality of stacked power storage modules; and a plurality of recessed holes formed side by side in a direction orthogonal to a plate thickness direction of the plate for a battery stack, and extending from a second plate side surface of the housing.

The present disclosure has been briefly described as above. Further, details of the present disclosure will be further clarified by reading through an embodiment described below (hereinafter referred to as the "embodiment") with reference to the accompanying drawings.

DESCRIPTION OF EMBODIMENT

Hereinafter, an example of an embodiment according to the present disclosure will be described with reference to the drawings.

Figure 1:
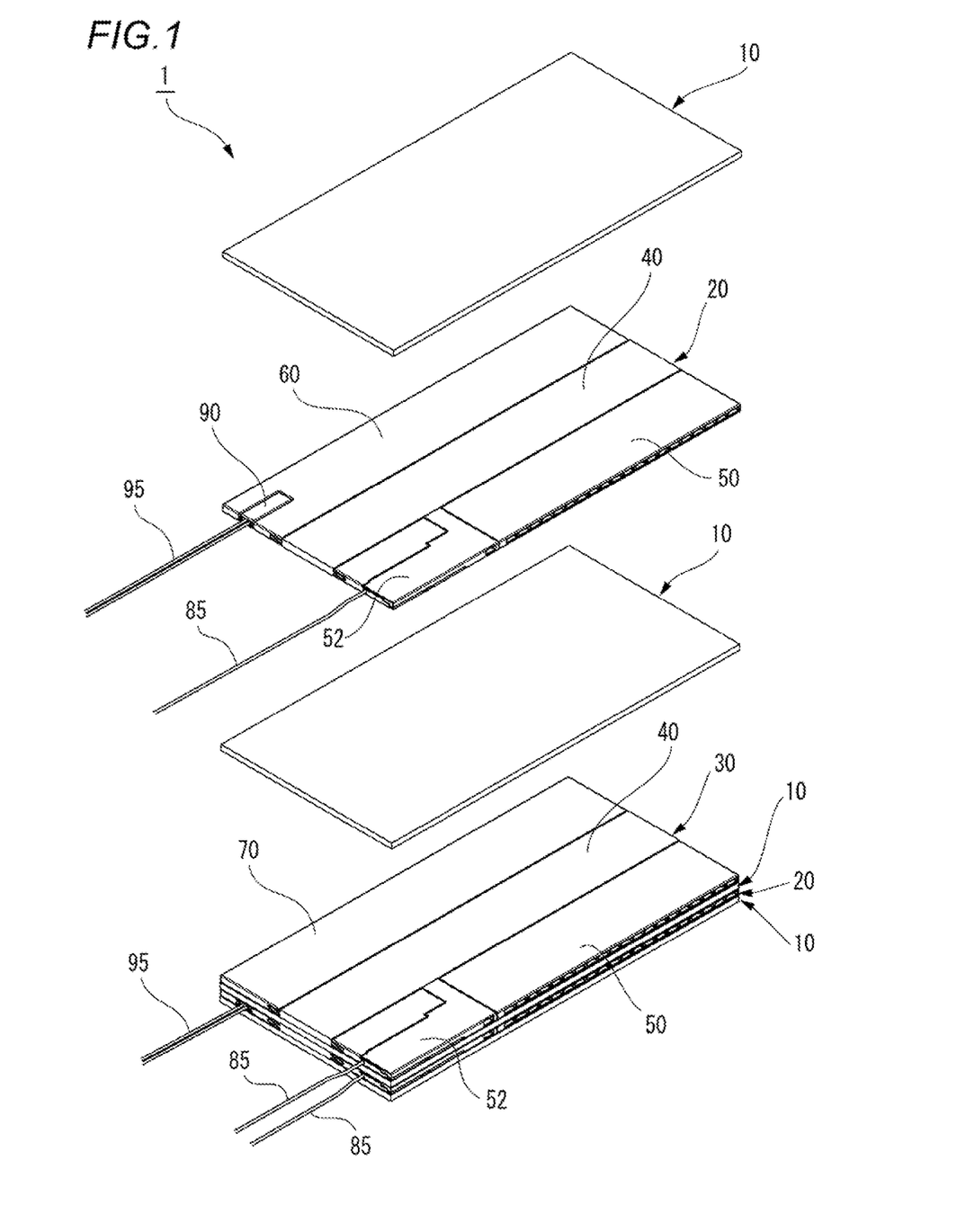
FIG. 1 is an exploded perspective view of a main part of a battery stack according to an embodiment of the present disclosure.
Figure 2A:
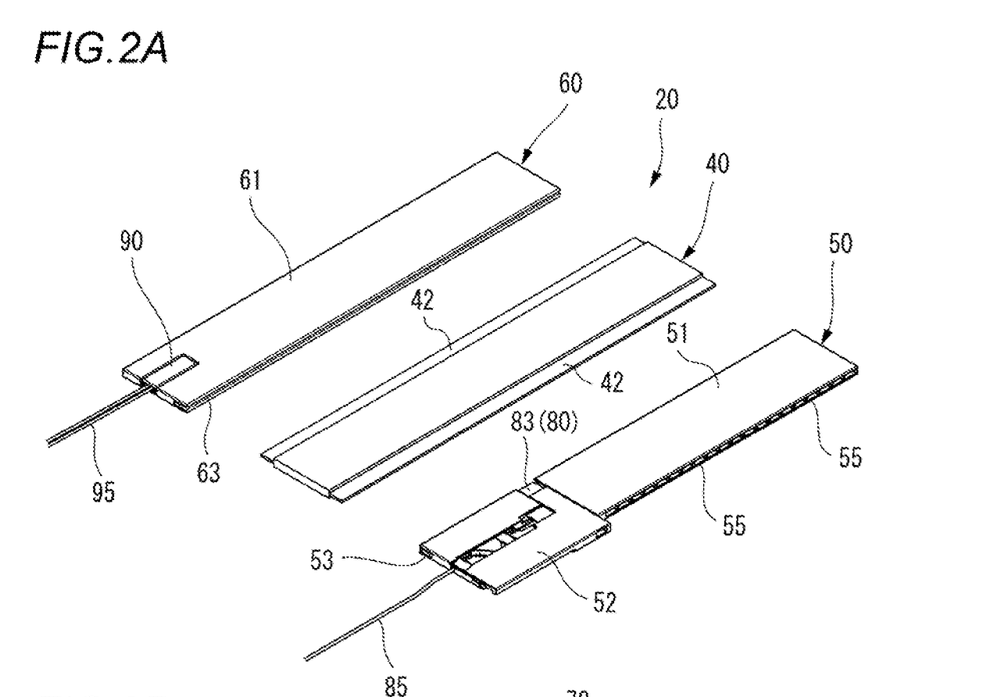
FIG. 2A is an exploded perspective view of a first plate-shaped member shown in FIG. 1.
Figure 2B:
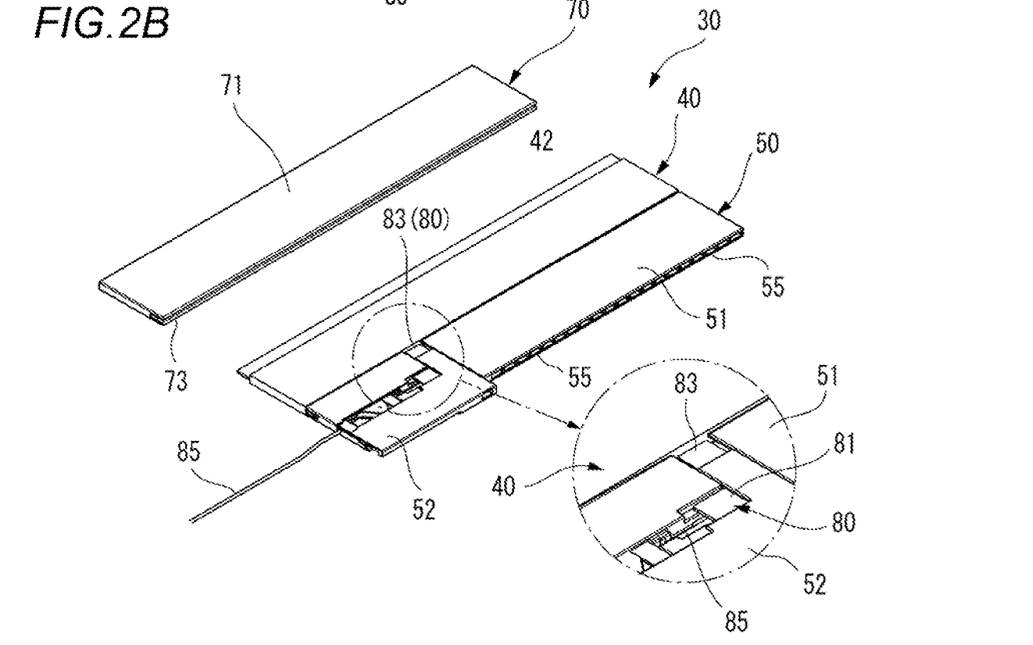
FIG. 2B is an exploded perspective view of a second plate-shaped member shown in FIG. 1.

FIG. 1 is an exploded perspective view of a main part of a battery stack 1 according to the embodiment of the present disclosure. FIG. 2A is an exploded perspective view of a first plate-shaped member 20 shown in FIG. 1, and FIG. 2B is an exploded perspective view of a second plate-shaped member 30 shown in FIG. 1.

As shown in FIG. 1, the battery stack 1 according to the present embodiment includes a plurality of (four in the present embodiment) stacked power storage modules 10, and first and second plate-shaped members (plate-shaped members) 20, 30 respectively disposed between the plurality of power storage modules 10. The battery stack 1 is disposed between a pair of insulating plates (not shown) and is formed in a substantially rectangular parallelepiped shape by a restraining tool (not shown).

The power storage module 10 is formed in a rectangular flat plate shape including, for example, a plurality of battery cells, a plurality of current collector plates, and a resin frame. The battery cell includes a positive electrode mixture layer formed of nickel hydroxide or the like, a negative electrode mixture layer formed of a hydrogen adsorption alloy or the like, a separator formed of a porous film formed of a polyolefin-based resin or the like, and an electrolytic solution.

It is needless to say that the power storage module 10 can be configured by a single battery cell, and a configuration of the battery cell is not limited to the above-described configuration, and various known battery configurations can be adopted.

As shown in FIGS. 1, 2A and 2B, the first plate-shaped member 20 according to the present embodiment is formed in a rectangular flat plate shape including a conductive plate 40, and a plate 50 for the battery stack and a plate 60 for the battery stack respectively fitted to both side edge portions 42 of the conductive plate 40.

The second plate-shaped member 30 is formed in a rectangular flat plate shape including the conductive plate 40, and the plate 50 for the battery stack and a plate 70 for the battery stack respectively fitted to both side edge portions 42 of the conductive plate 40.

The conductive plate 40 is formed in an elongated rectangular plate shape by a metal such as an aluminum alloy or copper, and both side edge portions 42 in a longitudinal direction are formed in a convex piece shape having a thin plate thickness. Both side edge portions 42 of the conductive plate 40 are respectively fitted into a fitting groove 53 of the plate 50 for the battery stack, and each of fitting grooves 63, 73 of the plates 60, 70 for the battery stack.

The conductive plate 40 is a conductive portion that electrically connects the adjacent power storage modules 10 to each other, and also serves as a heat sink that cools the adjacent power storage modules 10.

Figure 3:
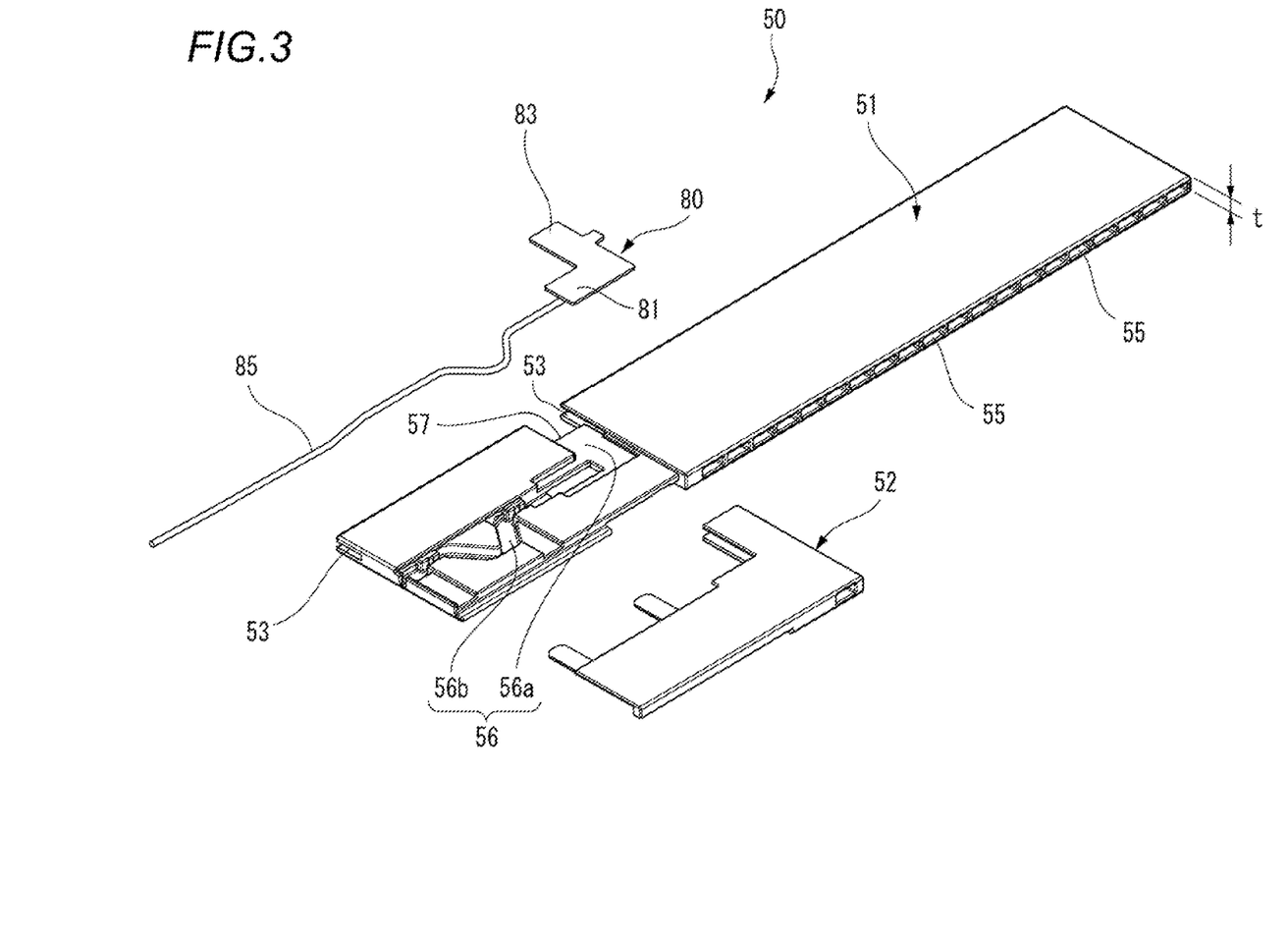
FIG. 3 is an exploded perspective view of a plate for the battery stack having a connection terminal shown in FIGS. 2A and 2B.
Figure 4:
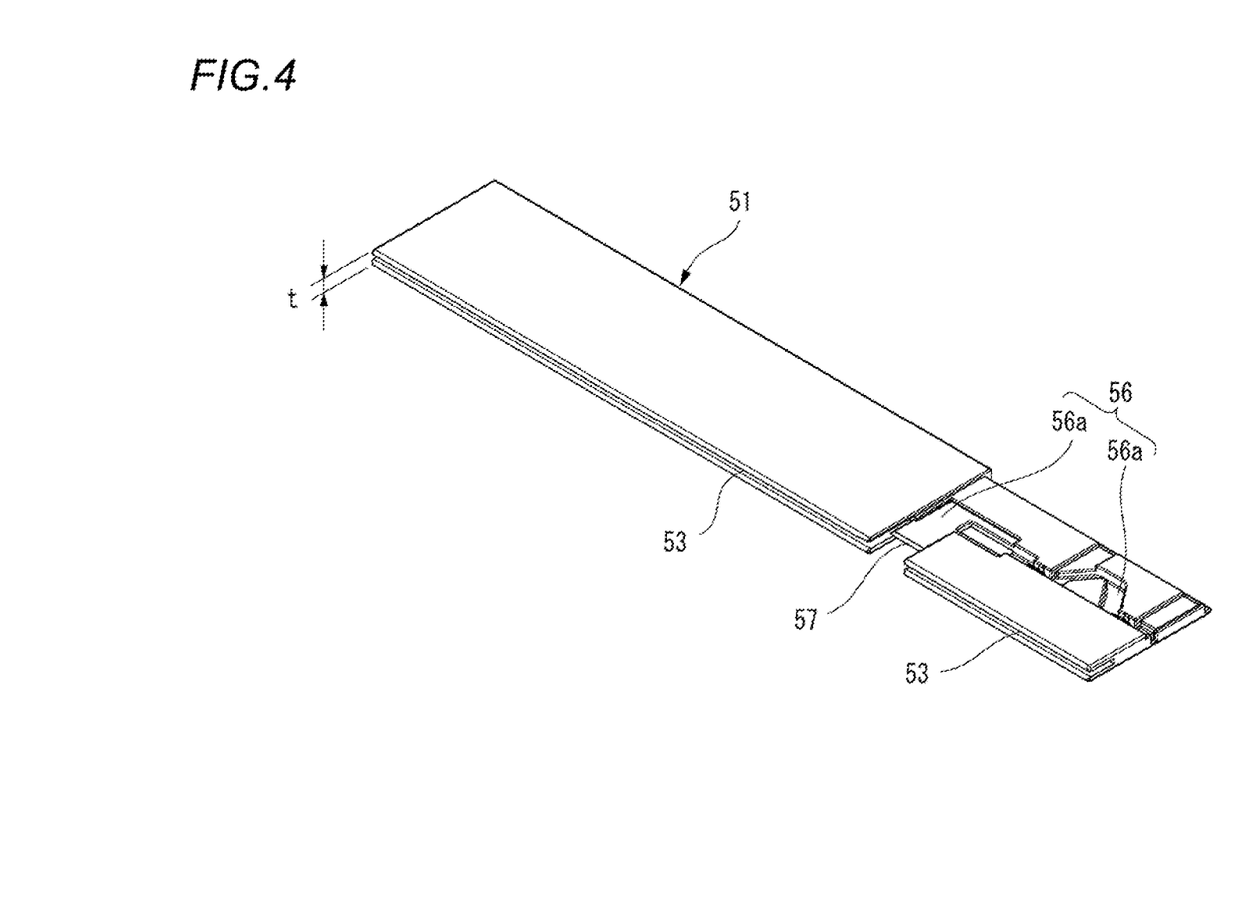
FIG. 4 is a perspective view seen from an opposite side of a housing shown in FIG. 3.
Figure 5:
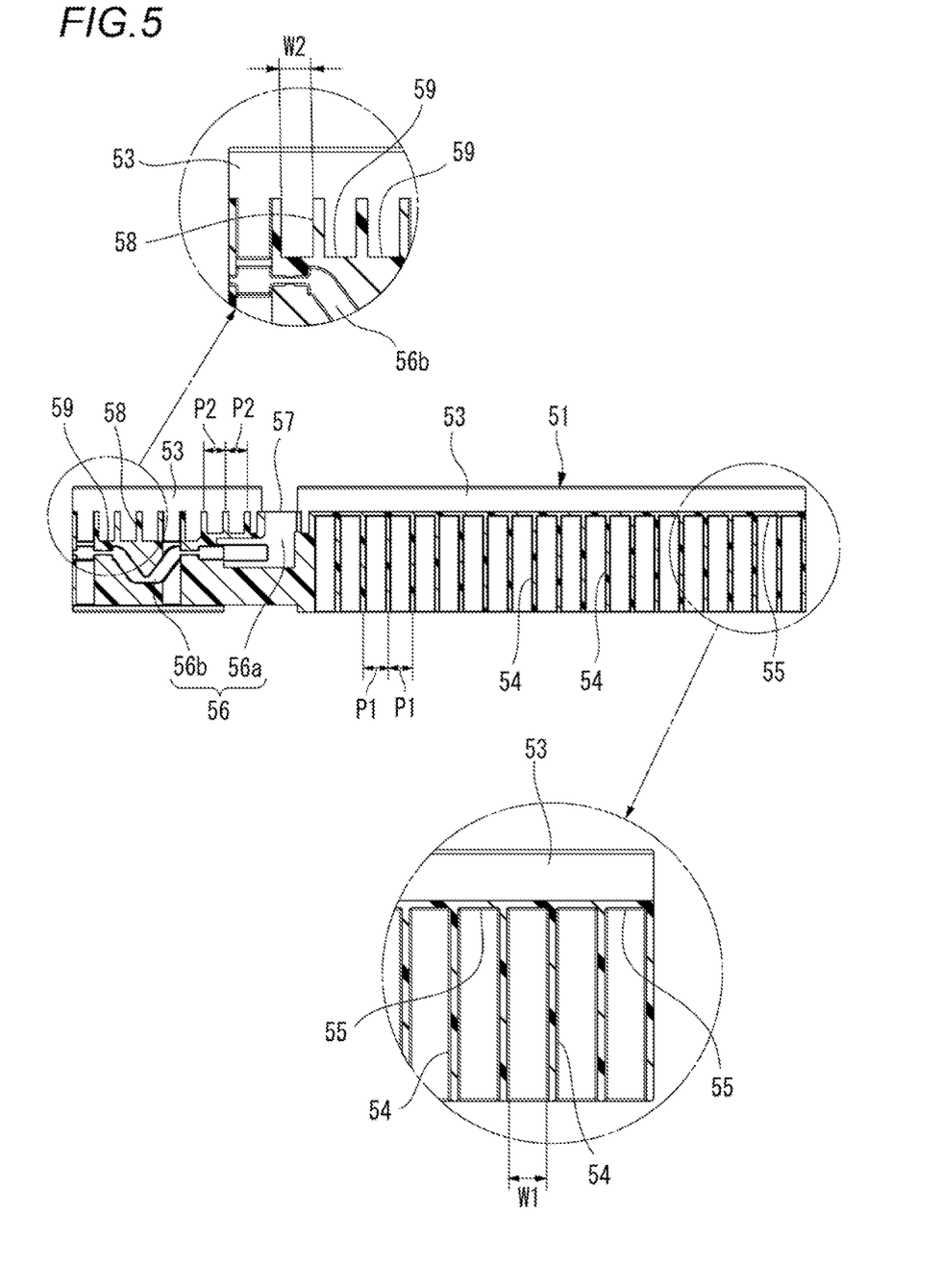
FIG. 5 is a horizontal sectional view and an enlarged view of a main part of the housing shown in FIG. 3.

FIG. 3 is an exploded perspective view of the plate 50 for the battery stack having a connection terminal 80 shown in FIGS. 2A and 2B. FIG. 4 is a perspective view seen from an opposite side of a housing 51 shown in FIG. 3. FIG. 5 is a horizontal sectional view and an enlarged view of a main part of the housing 51 shown in FIG. 3.

As shown in FIG. 3, the plate 50 for the battery stack according to the present embodiment is configured to include the elongated rectangular plate-shaped housing 51, the connection terminal 80, an electric wire 85 whose one terminal is connected to the connection terminal 80, and an insulating cover 52. Here, the electric wire 85 may be referred to as a first electric wire 85.

The connection terminal 80 is made of a conductive metal material such as copper or a copper alloy, and is formed in an L-shaped plate shape. The connection terminal 80 has an electric wire connection portion 81 at one end of an L shape and an electrical connection portion 83 at the other end of the L shape.

The electric wire connection portion 81 is electrically connected to the one terminal of the electric wire 85 by welding or the like. The other terminal of the electric wire 85 is electrically connected to a temperature detection circuit (not shown) via a connector or the like. The electrical connection portion 83 is electrically connected to the side edge portion 42 of the conductive plate 40 by welding or the like.

The housing 51 is formed by injection molding of an insulating resin material into an elongated rectangular plate shape having a predetermined plate thickness t.

As shown in FIG. 4, the fitting groove 53 for fitting to the side edge portion 42 of the conductive plate 40 is recessed in one plate side surface along a longitudinal direction of the housing 51. Here, the one plate side surface may be referred to as a first plate side surface. A surface of a plate surface of the housing 51 in which the fitting groove 53 is fitted to the side edge portion 42 of the conductive plate 40 is configured to be flush with a surface of a plate surface of the conductive plate 40.

As shown in FIG. 3, an accommodating recess 56 for accommodating the one terminal of the electric wire 85 and the connection terminal 80 is provided on one plate surface (upper surface in FIG. 3) on one end portion side in the longitudinal direction of the housing 51.

The accommodating recess 56 includes a terminal accommodating portion 56a that accommodates the connection terminal 80 and an electric wire accommodating portion 56b that accommodates the one terminal of the electric wire 85.

The terminal accommodating portion 56a is provided with a cutout portion 57 for bringing the electrical connection portion 83 of the connection terminal 80 into contact with the side edge portion 42 of the conductive plate 40 fitted into the fitting groove 53. Therefore, when the connection terminal 80 is accommodated in the terminal accommodating portion 56a, the electrical connection portion 83 comes into contact with the side edge portion 42 of the conductive plate 40, and welding work is facilitated.

Since the one terminal of the electric wire 85 bent in a V shape is accommodated in the electric wire accommodating portion 56b, when a tensile force acts on the other terminal of the electric wire 85, it is possible to prevent the tensile force from acting on an connection portion with the electric wire connection portion 81.

Further, as shown in FIGS. 3 and 5, on the other plate side surface (lower plate side surface in FIG. 5) along the longitudinal direction of the housing 51, a plurality of recessed holes 55 are formed side by side in a direction (upward direction in FIG. 5) orthogonal to a plate thickness direction from the other plate side surface. Here, the other plate side surface may be referred to as a second plate side surface. The plurality of recessed holes 55 are bottomed holes each having an opening width W1 and formed in a substantially rectangular parallelepiped shape so as to be arranged side by side at predetermined intervals on the other plate side surface. Therefore, ribs 54 having a predetermined pitch P1 are formed between the plurality of recessed holes 55. Here, the recessed holes may be referred to as thickness reduction holes.

As shown in FIG. 5, a plurality of recessed holes 59 are formed in a bottom portion of the fitting groove 53 on one end portion side (left end portion side in FIG. 5) in a longitudinal direction so as to be arranged side by side in a direction (downward direction in FIG. 5) orthogonal to the plate thickness direction. The plurality of recessed holes 59 are bottomed holes each having an opening width W2 and formed in a substantially rectangular parallelepiped shape so as to be arranged side by side at predetermined intervals in the bottom portion of the fitting groove 53 recessed in the one plate side surface. Therefore, ribs 58 having a predetermined pitch P2 are formed between the plurality of recessed holes 59.

A predetermined draft taper is formed in a molding mold that forms the recessed hole 55 and the recessed hole 59 during injection molding. Therefore, when the predetermined pitch P1 of the ribs 54 formed between the plurality of recessed holes 55 and the predetermined pitch P2 of the ribs 58 formed between the plurality of recessed holes 59 are formed to be the same, a rib width of the rib 54 and a rib width of the rib 58 are significantly different because the recessed hole 55 and the recessed hole 59 have different depths. When the rib width of the rib 54 and the rib width of the rib 58 are significantly different in this way, molding defects such as sink marks and warpage may occur. Therefore, the predetermined pitch P2 of the ribs 58 is set to be appropriately larger than the predetermined pitch P1 of the ribs 54 such that the rib width of the rib 58 is substantially the same as the rib width of the rib 54 in consideration of a predetermined draft taper of the molding mold.

As shown in FIGS. 2A, 2B and 3, the insulating cover 52 formed by injection molding of an insulating resin material is attached so as to sandwich the housing 51 from the plate thickness direction in order to cover the one terminal of the electric wire 85 and the connection terminal 80 accommodated in the accommodating recess 56. The insulating cover 52 covers the accommodating recess 56 so as to be flush with the surface of the plate surface of the housing 51.

The insulating cover 52 is attached to the housing 51 so as to be movable between a temporarily locked position and a fully locked position with respect to the housing 51. The insulating cover 52 at the temporarily locked position expose without covering the electrical connection portion 83 of the connection terminal 80 accommodated in the accommodating recess 56. The insulating cover 52 at the fully locked position completely covers the connection terminal 80 accommodated in the accommodating recess 56.

As described above, according to the plate 50 for the battery stack according to the present embodiment, in the plate-shaped housing 51 in which the fitting groove 53 for fitting to the side edge portion 42 of the conductive plate 40 is recessed in the plate side surface, it is possible to reduce a thickness while ensuring a compressive strength in the plate thickness direction and the apparent plate thickness t by the plurality of recessed holes 55, 59 formed side by side in the direction orthogonal to the plate thickness direction from the plate side surface of the housing 51, thereby preventing molding defects such as sink marks and warpage. Therefore, plate surfaces (front and back surfaces) of the plate 50 for the battery stack, which are stacked surfaces, are flat surfaces without unevenness.

The plate 50 for the battery stack can detect a voltage of the power storage module 10 by electrically connecting the one terminal of the electric wire 85 accommodated in the accommodating recess 56 of the housing 51 to the connection terminal 80 electrically connected to the side edge portion 42 of the conductive plate 40 and electrically connecting the other terminal of the electric wire 85 to a voltage detection circuit (not shown). Since the insulating cover 52 covers the accommodating recess 56 so as to be flush with the surface of the plate surface of the housing 51, the plate surfaces (front and back surfaces) of the plate 50 for the battery stack, which are the stacked surfaces, are flat surfaces without unevenness.

Therefore, in the plate 50 for the battery stack according to the present embodiment, which is disposed together with the conductive plate 40 between the plurality of power storage modules 10, when a restraining force is applied thereto by a restraining tool (not shown) for constituting the battery stack 1 that is a stacked body having a substantially rectangular parallelepiped shape, it is possible to prevent sandwiched surfaces of the power storage modules 10 from being damaged or prevent the plate surfaces of the plate 50 for the battery stack from being lifted due to inclination, and it is possible to detect the voltage of the power storage module 10.

Figure 6:
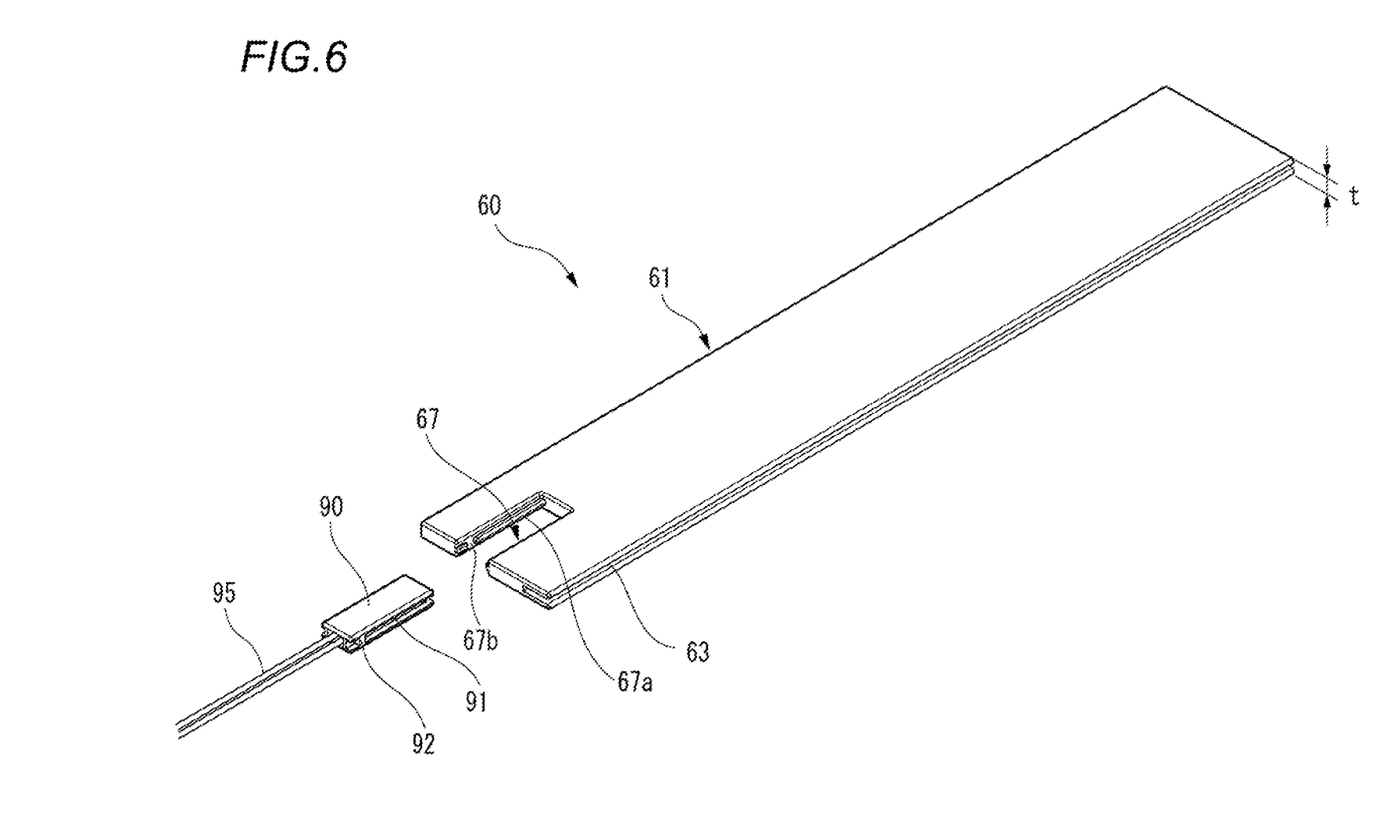
FIG. 6 is an exploded perspective view of a plate for the battery stack including a battery temperature sensor shown in FIG. 2A.
Figure 7:
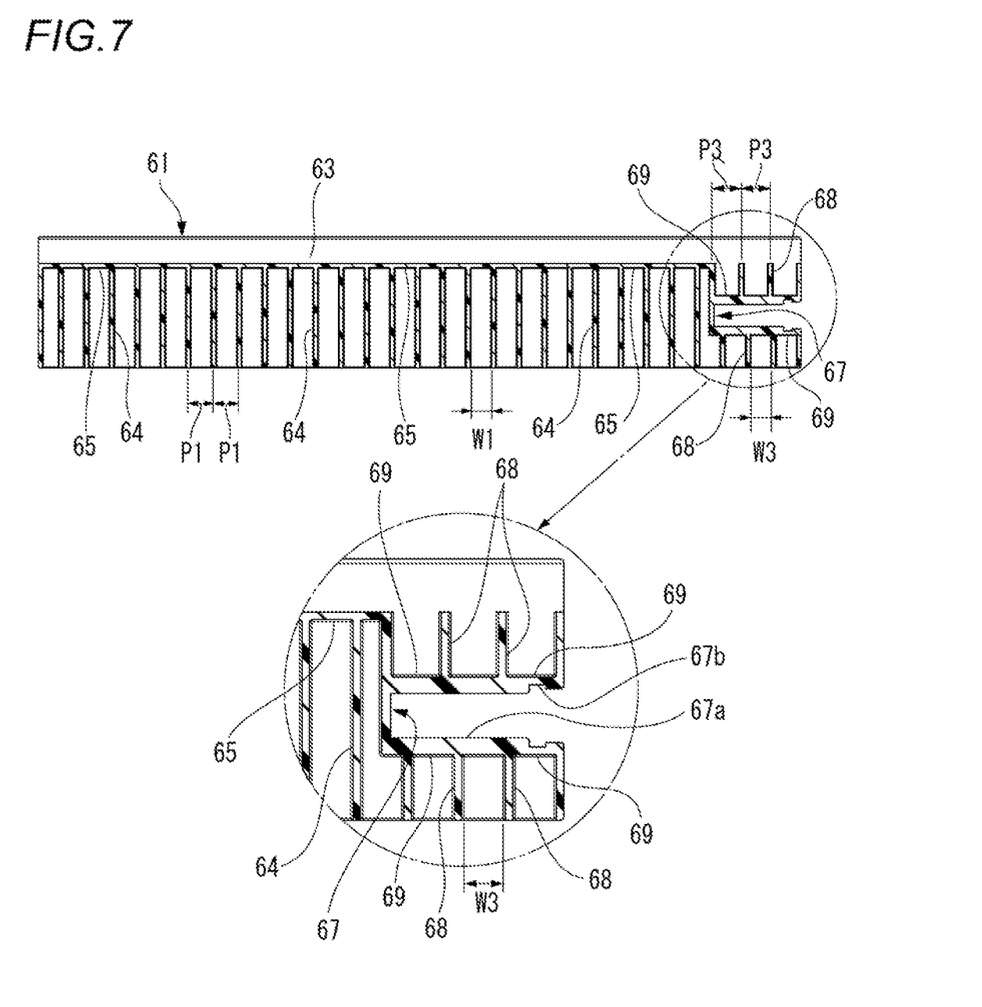
FIG. 7 is a horizontal sectional view and an enlarged view of a main part of a housing shown in FIG. 6.

FIG. 6 is an exploded perspective view of the plate 60 for the battery stack including a battery temperature sensor 90 shown in FIG. 2A. FIG. 7 is a horizontal sectional view and an enlarged view of a main part of a housing 61 shown in FIG. 6.

As shown in FIG. 6, the plate 60 for the battery stack according to the present embodiment is configured to include the elongated rectangular plate-shaped housing 61, the battery temperature sensor 90, and an electric wire 95 whose one terminal is connected to the battery temperature sensor 90. Here, the electric wire 95 may be referred to as a second electric wire 95.

The battery temperature sensor 90 is attached to the housing 61 and is interposed between plate surfaces of the power storage modules 10 adjacent to each other, thereby detecting temperatures of the energy storage modules 10. The other terminal of the electric wire 95 whose one terminal is connected to the battery temperature sensor 90, is electrically connected to a temperature detection circuit (not shown) via a connector or the like.

The housing 61 is formed by injection molding of an insulating resin material into an elongated rectangular plate shape having the predetermined plate thickness t.

As shown in FIG. 6, a fitting groove 63 for fitting to the side edge portion 42 of the conductive plate 40 is recessed in one plate side surface along a longitudinal direction of the housing 61. Here, the one plate side surface along the longitudinal direction may be referred to as a third plate side surface. A surface of a plate surface of the housing 61 in which the fitting groove 63 is fitted to the side edge portion 42 of the conductive plate 40 is configured to be flush with a surface of a plate surface of the conductive plate 40.

As shown in FIG. 6, a sensor accommodating portion 67 for accommodating the battery temperature sensor 90 is recessed in one plate side surface of a longitudinal end portion of the housing 61. Here, the one plate side surface of the longitudinal end may be referred to as a fourth plate side surface. The sensor accommodating portion 67 is a recess formed by cutting out the one plate side surface so as to penetrate the housing 61 in a plate thickness direction.

Guide grooves 91 formed on both side surfaces of the battery temperature sensor 90 are inserted and guided by guide ribs 67a protruding from both side walls of the sensor accommodating portion 67. Then, a locking protrusion 92 is locked to a locking recess 67b, so that the battery temperature sensor 90 is held in the sensor accommodating portion 67.

Further, as shown in FIG. 7, on the other plate side surface (lower plate side surface in FIG. 7) along the longitudinal direction of the housing 61, a plurality of recessed holes 65 are formed side by side in a direction (upward direction in FIG. 7) orthogonal to the plate thickness direction from the other plate side surface. The plurality of recessed holes 65 are bottomed holes each having the opening width W1 and formed in a substantially rectangular parallelepiped shape so as to be arranged side by side at predetermined intervals on the other plate side surface. Therefore, ribs 64 having a predetermined pitch P1 are formed between the plurality of recessed holes 65.

As shown in FIG. 7, a plurality of recessed holes 69 are formed in both plate side surfaces of the housing 61 across the sensor accommodating portion 67 so as to be arranged side by side in a direction orthogonal to the plate thickness direction from each plate side surface. The recessed holes 69 formed in the one plate side surface in which the fitting groove 53 is recessed are formed in a bottom portion of the fitting groove 53. The plurality of recessed holes 69 are bottomed holes each having an opening width W3 and formed in a substantially rectangular parallelepiped shape so as to be arranged side by side at predetermined intervals on both plate side surfaces. Therefore, ribs 68 having a predetermined pitch P3 are formed between the plurality of recessed holes 69.

As described above, the predetermined pitch P3 of the ribs 68 is set to be appropriately larger than the predetermined pitch P1 of the ribs 64 such that the rib width of the rib 68 is substantially the same as the rib width of the rib 64 in consideration of a predetermined draft taper of a molding mold.

As described above, according to the plate 60 for the battery stack according to the present embodiment, in the plate-shaped housing 61 in which the fitting groove 63 for fitting to the side edge portion 42 of the conductive plate 40 is recessed in the plate side surface, it is possible to reduce a thickness while ensuring a compressive strength in the plate thickness direction and the apparent plate thickness t by the plurality of recessed holes 65, 69 formed side by side in the direction orthogonal to the plate thickness direction from the plate side surface of the housing 61, thereby preventing molding defects such as sink marks and warpage. Therefore, plate surfaces (front and back surfaces) of the plate 60 for the battery stack, which are stacked surfaces, are flat surfaces without unevenness.

Therefore, in the plate 60 for the battery stack according to the present embodiment, which is disposed together with the conductive plate 40 between the plurality of power storage modules 10, when a restraining force is applied thereto by a restraining tool (not shown) for constituting the battery stack 1 that is a stacked body having a substantially rectangular parallelepiped shape, it is possible to prevent sandwiched surfaces of the power storage modules 10 from being damaged or prevent the plate surfaces of the plate 60 for the battery stack from being lifted due to inclination, and it is possible to detect the temperature of the power storage module 10.

In the plate 60 for the battery stack, one terminal of the electric wire 95 is connected to the battery temperature sensor 90 accommodated in the sensor accommodating portion 67 of the housing 61, and the other terminal of the electric wire 95 is electrically connected to a temperature detection circuit (not shown), so that the temperature of the power storage module 10 can be detected.

Figure 8:
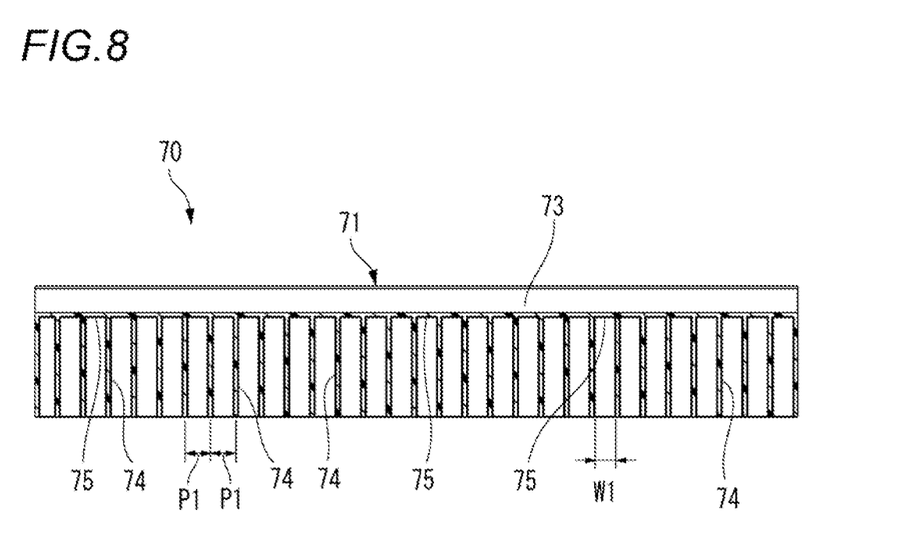
FIG. 8 is a horizontal sectional view of a housing of a dummy plate for the battery stack shown in FIG. 2B.

FIG. 8 is a horizontal sectional view of a housing 71 of the dummy plate 70 for the battery stack shown in FIG. 2B.

As shown in FIG. 8, the plate 70 for the battery stack according to the present embodiment is configured to include the elongated rectangular plate-shaped housing 71. The plate 70 for the battery stack is a dummy plate that is interposed between plate surfaces of the adjacent power storage modules 10 so as to maintain an interval between the power storage modules 10 at a predetermined interval, and is not provided with functional components such as the connection terminal 80 and the battery temperature sensor 90.

The housing 71 is formed by injection molding of an insulating resin material into an elongated rectangular plate shape having the predetermined plate thickness t.

As shown in FIGS. 2B and 8, the fitting groove 73 for fitting to the side edge portion 42 of the conductive plate 40 is recessed in one plate side surface along a longitudinal direction of the housing 71. A surface of a plate surface of the housing 71 in which the fitting groove 73 is fitted to the side edge portion 42 of the conductive plate 40 is configured to be flush with a surface of a plate surface of the conductive plate 40.

Further, as shown in FIG. 8, on the other plate side surface (lower plate side surface in FIG. 8) along the longitudinal direction of the housing 71, a plurality of recessed holes 75 are formed side by side in a direction (upward direction in FIG. 8) orthogonal to a plate thickness direction from the other plate side surface. The plurality of recessed holes 75 are bottomed holes each having the opening width W1 and formed in a substantially rectangular parallelepiped shape so as to be arranged side by side at predetermined intervals on the other plate side surface. Therefore, ribs 74 having a predetermined pitch P1 are formed between the plurality of recessed holes 75.

As described above, according to the plate 70 for the battery stack according to the present embodiment, in the plate-shaped housing 71 in which the fitting groove 73 for fitting to the side edge portion 42 of the conductive plate 40 is recessed in the plate side surface, it is possible to reduce a thickness while ensuring a compressive strength in the plate thickness direction and the apparent plate thickness t by the plurality of recessed holes 75 formed side by side in the direction orthogonal to the plate thickness direction from the plate side surface of the housing 71, thereby preventing molding defects such as sink marks and warpage. Therefore, plate surfaces (front and back surfaces) of the plate 70 for the battery stack, which are stacked surfaces, are flat surfaces without unevenness.

Therefore, in the plate 70 for the battery stack according to the present embodiment, which is disposed together with the conductive plate 40 between the plurality of power storage modules 10, when a restraining force is applied thereto by a restraining tool (not shown) for constituting the battery stack 1 that is a stacked body having a substantially rectangular parallelepiped shape, it is possible to prevent sandwiched surfaces of the power storage modules 10 from being damaged or prevent the plate surfaces of the plate 70 for the battery stack from being lifted due to inclination.

Then, as shown in FIG. 1, the two first plate-shaped members 20 each including the plate 50 for the battery stack and the plate 60 for the battery stack respectively fitted to both side edge portions 42 of the conductive plate 40, and the second plate-shaped member 30 including the plate 50 for the battery stack and the plate 70 for the battery stack respectively fitted to both side edge portions 42 of the conductive plate 40 are respectively disposed between the four power storage modules 10 to form the battery stack 1.

Therefore, according to the battery stack 1 according to the present embodiment, the first and second plate-shaped members 20, 30 respectively disposed between the four stacked power storage modules 10 are constituted by the conductive plate 40 electrically connecting the adjacent power storage modules 10 to each other, and the plates 50, 60, 70 for the battery stack appropriately fitted to the side edge portions 42 of the conductive plate 40, respectively.

Therefore, in the battery stack 1 according to the present configuration, when a restraining force is applied thereto by a restraining tool (not shown), it is possible to prevent the sandwiched surfaces of the power storage modules 10 from being damaged or prevent the plate surfaces of the plates 50, 60, 70 for the battery stack from being lifted due to inclination.

Figure 9:
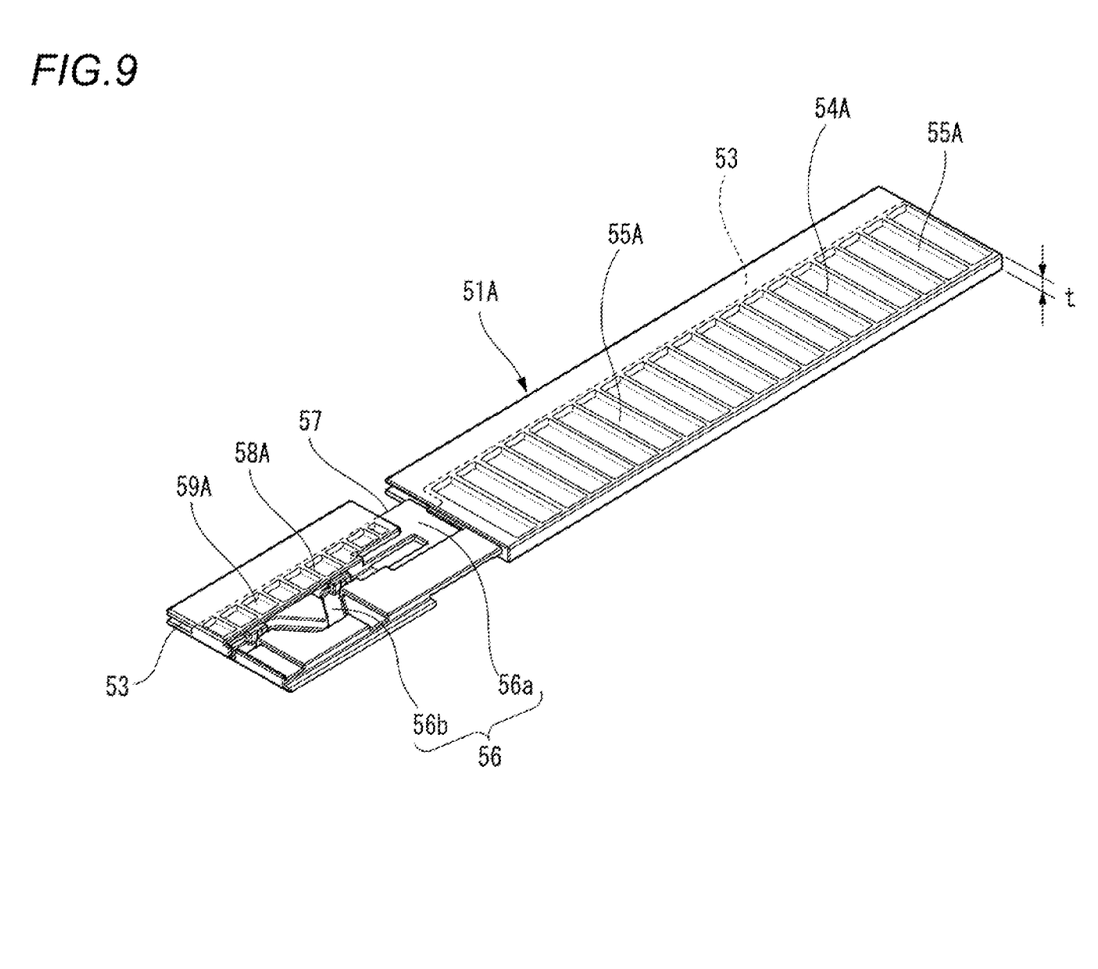
FIG. 9 is a perspective view of a housing for a battery stack according to a reference example.

FIG. 9 is a perspective view of a housing 51A for a battery stack according to a reference example. Components of the housing 51A the same as those of the housing 51 described above are denoted by the same reference numerals, and detailed description thereof will be omitted.

As shown in FIG. 9, the housing 51A according to the reference example is formed by injection molding of an insulating resin material into an elongated rectangular plate shape having the predetermined plate thickness t.

The fitting groove 53 for fitting to the side edge portion 42 of the conductive plate 40 is recessed in one plate side surface along a longitudinal direction of the housing 51A.

On one plate surface (upper surface in FIG. 9) of the housing 51A, a plurality of recessed portions 55A, 59A are provided at predetermined intervals along the longitudinal direction together with the accommodating recess 56. The plurality of recessed portions 55A, 59A are bottomed holes having rectangular openings. Therefore, ribs 54A having a predetermined pitch are formed between the plurality of recessed portions 55A, and ribs 58A having a predetermined pitch are formed between the plurality of recessed portions 59A. Here, the recessed portions may be referred to as thickness reduction portions.

In this way, by providing the plurality of recessed portions 55A, 59A on the plate surface of the flat plate-shaped housing 51A, it is possible to reduce a thickness of the housing 51A while ensuring a compressive strength in a plate thickness direction and the apparent plate thickness t, and to prevent molding defects such as sink marks and warpage.

However, in a case where the plurality of recessed portions 55A, 59A are provided on the plate surface of the housing 51A that is a stacked surface, unevenness formed by the plurality of recessed portions 55A, 59A and the ribs 54A, 58A are formed on the plate surface of the housing 51A as shown in FIG. 9. Therefore, in the housing 51A for the battery stack in which the plurality of recessed portions 55A, 59A are provided, when a restraining force is applied thereto by a restraining tool (not shown) for constituting a stacked body, sandwiched surfaces of the power storage modules 10 may be damaged or the plate surfaces of the housing 51A may be lifted due to inclination.

As described above, according to the present disclosure, it is possible to provide the plates 50, 60, 70 for the battery stack, which can be favorably sandwiched between the plurality of stacked power storage modules 10, and the battery stack 1.

It should be noted that the present disclosure is not limited to the embodiment described above, and modifications, improvements, and the like can be made as appropriate. In addition, materials, shapes, dimensions, numbers, arrangement positions, and the like of components in the embodiment described above are optional and are not limited as long as the invention can be achieved.

According to a first illustrative aspect of the present disclosure, a plate (50, 60, 70) for a battery stack configured to be sandwiched between a plurality of power storage modules (10), includes: a plate-shaped housing (51, 61, 71) having a fitting groove (53, 63, 73) provided in a recessed shape in a first plate side surface of the plate for a battery stack along a longitudinal direction thereof, the fitting groove (53, 63, 73) being a groove configured to fit with a side edge portion (42) of a conductive plate (40) disposed between the plurality of stacked power storage modules (10); and a plurality of recessed holes (55, 59, 65, 69, 70) formed side by side in a direction orthogonal to a plate thickness direction of the plate for a battery stack, and extending from a second plate side surface of the housing (51, 61, 71).

According to the first illustrative aspect, in the plate-shaped housing in which the fitting groove for fitting to the side edge portion of the conductive plate is recessed in the plate side surface thereof, it is possible to reduce a thickness while ensuring a compressive strength in the plate thickness direction and an apparent plate thickness by the plurality of recessed holes formed side by side in the direction orthogonal to the plate thickness direction from the plate side surface of the housing, thereby preventing molding defects such as sink marks and warpage. Therefore, plate surfaces (front and back surfaces) of the plate for the battery stack, which are stacked surfaces, are flat surfaces without unevenness.

Therefore, in the plate for the battery stack according to the present configuration, which is disposed together with the conductive plate between the plurality of power storage modules, when a restraining force is applied thereto by a restraining tool for constituting the battery stack that is a substantially rectangular parallelepiped stacked body, it is possible to prevent sandwiched surfaces of the power storage modules from being damaged or prevent the stacked surfaces from being lifted due to inclination.

According to a second illustrative aspect of the present disclosure, the plate (50) for the battery stack may further include: a connection terminal (80) electrically connected to the side edge portion (42) of the conductive plate (40) fitted in the fitting groove (53); a first electric wire (85) having one terminal connected to the connection terminal, and the other terminal led out from a third plate side surface of the housing in the longitudinal direction; an accommodating recess (56) provided on one of plate surfaces of the housing (51) in the plate thickness direction and accommodating the one terminal of the first electric wire and the connection terminal (80); and an insulating cover (52) that covers the accommodating recess (56) to be flush with the plate surfaces of the housing (51).

According to the second illustrative aspect, the one terminal of the electric wire accommodated in the accommodating recess of the housing is connected to the connection terminal electrically connected to the side edge portion of the conductive plate, and the other terminal of the electric wire is electrically connected to a voltage detection circuit, so that a voltage of the power storage module can be detected. Since the insulating cover covers the accommodating recess so as to be flush with the surface of the plate surface of the housing, plate surfaces (front and back surfaces) of the plate for the battery stack, which are stacked surfaces, are flat surfaces without unevenness.

Therefore, in the plate for the battery stack according to the present configuration, which is disposed together with the conductive plate between the plurality of power storage modules, when a restraining force is applied thereto by a restraining tool for constituting the battery stack that is a substantially rectangular parallelepiped stacked body, it is possible to prevent sandwiched surfaces of the power storage modules from being damaged or prevent the stacked surfaces from being lifted due to inclination, and it is possible to detect the voltage of the power storage module.

According to a third illustrative aspect of the present disclosure, the plate (60) for the battery stack may further include: a sensor accommodating portion (67) provided in a recessed shape in a fourth plate side surface of the housing (61); a battery temperature sensor (90) accommodated in the sensor accommodating portion (67); and a second electric wire (95) having one terminal connected to the battery temperature sensor (90).

According to the third illustrative aspect, the one terminal of the electric wire is connected to the battery temperature sensor accommodated in the sensor accommodating portion of the housing, and the other terminal of the electric wire is electrically connected to a temperature detection circuit, so that a temperature of the power storage module can be detected. Since the battery temperature sensor accommodated in the sensor accommodating portion of the housing is accommodated flush with a surface of a plate surface of the housing, plate surfaces (front and back surfaces) of the plate for the battery stack, which are stacked surfaces, are flat surfaces without unevenness.

Therefore, in the plate for the battery stack according to the present configuration, which is disposed together with the conductive plate between the plurality of power storage modules, when a restraining force is applied thereto by a restraining tool for constituting the battery stack that is a substantially rectangular parallelepiped stacked body, it is possible to prevent sandwiched surfaces of the power storage modules from being damaged or prevent the stacked surfaces from being lifted due to inclination, and it is possible to detect the temperature of the power storage module.

According to a fourth illustrative aspect of the present disclosure, a battery stack (1) may include: the plate (50, 60, 70) for the battery stack according to any one of the first to third aspects.

According to the fourth illustrative aspect, each of the plate-shaped members disposed between the plurality of stacked power storage modules includes the conductive plate that electrically connects the adjacent power storage modules to each other, and the plate for the battery stack that is appropriately fitted to each side edge portion of the conductive plate.

Therefore, in the battery stack according to the present configuration, which is disposed together with the conductive plate between the plurality of power storage modules, when a restraining force is applied thereto by a restraining tool, it is possible to prevent sandwiched surfaces of the power storage modules from being damaged or the plate surfaces of the plate for the battery stack from being lifted due to inclination.

According to the present disclosure, it is possible to provide a plate for a battery stack, which can be favorably sandwiched between a plurality of stacked power storage modules, and a battery stack.

What is claimed is:

1. A plate for a battery stack configured to be sandwiched between a plurality of power storage modules and fit with a conductive plate, the plate for a battery stack comprising:
    a plate-shaped housing having:
        a first plate side surface on an outer side of the plate-shaped housing,
        a second plate side surface on an outer side of the plate-shaped housing opposite to the first plate side surface, and
        top and bottom surfaces on outer sides that are different from the first plate side surface and the second plate side surface, and facing along a plate thickness direction,
    wherein the plate-shaped housing has a fitting groove provided in the first plate side surface of the plate for a battery stack along a longitudinal direction of the first plate side surface, the fitting groove forming a recessed shape configured to fit directly with a side edge portion of the conductive plate on an outer side of the first plate side surface with respect to the housing; and
    a plurality of recessed holes formed side by side in a direction orthogonal to the plate thickness direction of the plate for a battery stack, and extending from the second plate side surface of the housing,
    wherein, among the top and bottom surfaces and the second plate side surface, the plurality of recessed holes are formed only in the second plate side surface, and
    wherein, among the top and bottom surfaces and the first plate side surface, the fitting groove is provided only in the first plate side surface.

2. The plate for the battery stack according to claim 1, further comprising:
    a sensor accommodating portion provided in a recessed shape in a fourth plate side surface of the housing;
    a battery temperature sensor accommodated in the sensor accommodating portion; and
    a second electric wire having one terminal connected to the battery temperature sensor.

3. A battery stack comprising:
    the plate for the battery stack according to claim 1.

4. The plate for the battery stack according to claim 1, wherein the fitting groove is configured to fit directly with the side edge portion of the conductive plate on an outer side of the housing, the outer side being adjacent to the first plate side surface in the direction orthogonal to the plate thickness direction.

5. The plate for the battery stack according to claim 1, wherein, among the top and bottom surfaces, the first plate side surface, and the second plate side surface, the plurality of recessed holes are formed only in the second plate side surface.

6. The plate for the battery stack according to claim 5, wherein the plurality of recessed holes are bottomed holes.

7. The plate for the battery stack according to claim 6, wherein a lateral direction is orthogonal to the plate thickness direction and the longitudinal direction, and
    wherein the plurality of recessed holes extend from the second plate side surface along the lateral direction.

8. The plate for the battery stack according to claim 6, wherein, among the top and bottom surfaces, the first plate side surface, and the second plate side surface, the fitting groove is provided only in the first plate side surface.

9. The plate for the battery stack according to claim 8, wherein, for a first distance in the longitudinal direction, one fitting groove is provided along an entirety of the first distance in the first plate side surface,
    wherein, for the first distance in the direction orthogonal to the plate thickness direction, a plurality of recessed holes are formed side by side along an entirety of the first distance in the second plate side surface, and
    wherein the longitudinal direction corresponds with the direction orthogonal to the plate thickness direction.

10. The plate for the battery stack according to claim 1, wherein, for a first distance in the longitudinal direction, one fitting groove is provided along an entirety of the first distance in the first plate side surface,
    wherein, for the first distance in the direction orthogonal to the plate thickness direction, a plurality of recessed holes are formed side by side along an entirety of the first distance in the second plate side surface, and
    wherein the longitudinal direction corresponds with the direction orthogonal to the plate thickness direction.

11. A plate for a battery stack configured to be sandwiched between a plurality of power storage modules, comprising:
    a plate-shaped housing having a fitting groove provided in a recessed shape in a first plate side surface of the plate for a battery stack along a longitudinal direction thereof, the fitting groove being a groove configured to fit with a side edge portion of a conductive plate disposed between the plurality of stacked power storage modules;

a plurality of recessed holes formed side by side in a direction orthogonal to a plate thickness direction of the plate for a battery stack, and extending from a second plate side surface of the housing;

a connection terminal electrically connected to the side edge portion of the conductive plate fitted in the fitting groove;

a first electric wire having one terminal connected to the connection terminal, and another terminal led out from a third plate side surface of the housing in the longitudinal direction;

an accommodating recess provided on one of plate surfaces of the housing in the plate thickness direction and accommodating the one terminal of the first electric wire and the connection terminal; and an insulating cover that covers the accommodating recess to be flush with the plate surfaces of the housing.

* * * * *